H. G. C. THOFEHRN.
BATTERY.
APPLICATION FILED FEB. 13, 1915.
1,182,513.
Patented May 9, 1916.
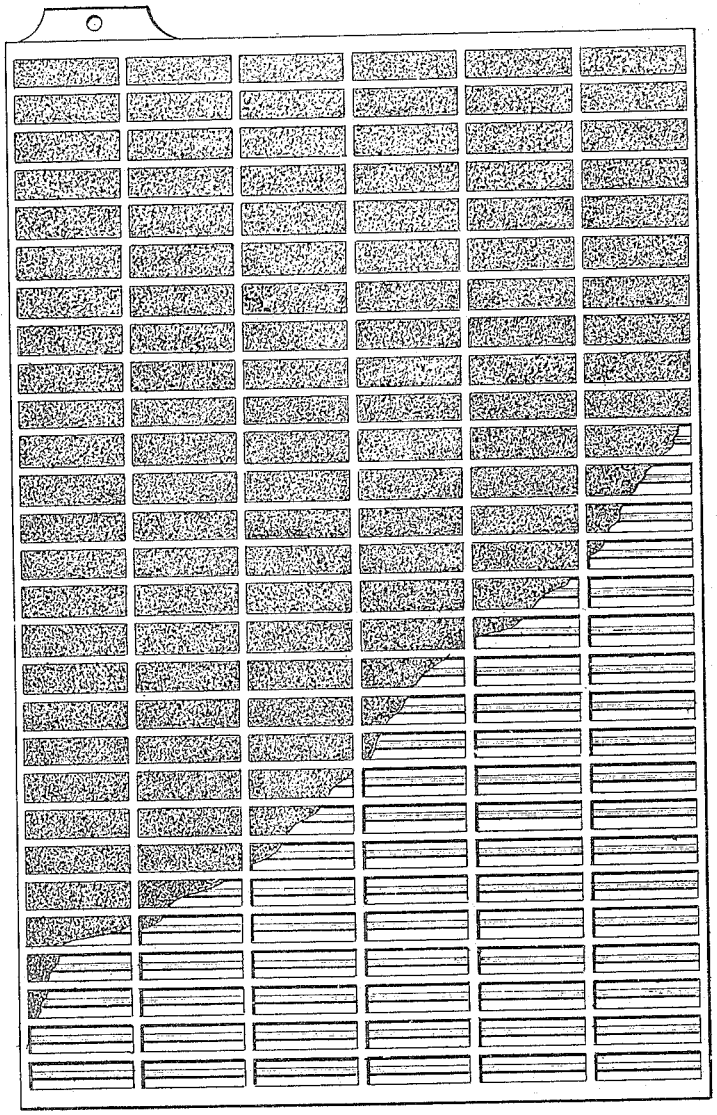
WITNESSES
INVENTOR
H. G. C. Thofehrn
By H. A. Seymour, Attorney

UNITED STATES PATENT OFFICE.

HERMANN G. C. THOFEHRN, OF PITTSBURGH, PENNSYLVANIA, ASSIGNOR TO JOSEPH M. FLANNERY, OF PITTSBURGH, PENNSYLVANIA.

BATTERY.

1,182,513.     Specification of Letters Patent.     Patented May 9, 1916.

Application filed February 13, 1915. Serial No. 8,115.

*To all whom it may concern:*

Be it known that I, HERMANN G. C. THOFEHRN, a citizen of the United States, and a resident of Pittsburgh, in the county of Allegheny and State of Pennsylvania, have invented certain new and useful Improvements in Batteries; and I do hereby declare the following to be a full, clear, and exact description of the invention, such as will enable others skilled in the art to which it appertains to make and use the same.

This invention relates to improvements in batteries and more particularly to electrodes therefor.

It is common practice in the manufacture of storage batteries to provide the electrodes with active material, in the form of a paste of red lead ($Pb_2O_3$) for the positive plates and litharge (PbO) for the negative plates. The electric conductivity of this active material or paste is comparatively low, and for this reason, it has been the custom to reduce as much as possible the sizes of the paste bodies filling the grids or plates. That is to say, it has been the practice of makers of storage battery electrodes, to subdivide the paste or active material as much as possible so that the lead of the grids, which conducts the current, shall be thoroughly distributed through and make numerous contacts with the mass of active material,—without, however, weakening the mechanical resistance of the grid.

As the action of charging and discharging of a battery is an electro-chemical process,—transforming the lead oxid of the paste into metallic lead during the period of charging and transforming the produced mossy metallic lead into oxids and sulfates during the discharging period,—it is important that the electric current traversing the plates (grids and paste) shall meet with the least possible resistance and be able to readily permeate the total mass of paste. The importance of enhancing the electrical conductivity of the paste or active material will be at once appreciated when it is remembered that any resistance to the passage of the electric current creates heat, and that the amount of current transformed into heat does not produce electrochemical work, but decreases the efficiency of the battery.

Another result of insufficient penetration of the current through the mass of active material, is the formation of nodules or streaks, which become non-active wherever such parts of the paste are too far removed from the conducting ribs of the grid. Again, it has been found that the alternate oxidizing and the reducing action of the current on the paste, produce alternate swelling and shrinking, or expansion and contraction of the plates in which the non-active nodules or streaks do not take part. The consequence of this action is the creation of a molecular tension within the body of the paste, causing it to crumble in proportion to the extent and number of inactive parts in the paste. Again, the amount of current which can be absorbed and given off by a battery, depends very much upon the permeability of the paste or active material. The greater this permeability, and also the greater the conductivity of the paste the higher will be the efficiency of the battery.

The object of my invention is to overcome the various deficiencies in battery electrodes, as hereinbefore enumerated, and to provide active material or paste which shall be homogeneous; readily and uniformly permeable, and in which resistance to electrical conductivity shall be reduced to a minimum.

A further object is to produce a battery electrode provided with applied active material, in which the said active material shall be such that it will maintain a uniform mechanical consistency and electrical conductivity throughout all its particles; and prolong the life, stability and efficiency of the battery of which the same forms an element.

With these and other objects in view, the invention consists in a battery electrode having a radio-active substance incorporated therein.

The invention further consists in a storage battery electrode having an insoluble radio-active salt in intimate contact with the active material of the electrode.

The invention further consists in a battery electrode having active material incorporated therein, said active material having radio active material incorporated therein.

The invention further consists of a storage battery element comprising active material combined with a radio-active substance.

The invention further consists in certain novel combinations of ingredients composing the active-material element of a storage battery as hereinafter set forth and pointed out in the claims.

The accompanying drawing is a view of a grid for a battery electrode showing an application of the active material thereto.

My improved active material element comprises active material such as lead oxid paste having radio-active material incorporated therein. The radio-active material which I have found to be most effective is derived from the radium class of metals, because of the very high activity of the same and the consequent possibility of employing only infinitesimal quantities to effect the desired result. Among the substances derived from the radium group, I have found that the radium in radium-barium sulfate in the lead oxid active material gives excellent results, and at a cost which will permit its use. The barium serves as a carrier for the radium and any beneficial effect which may result from the presence of barium is incidental. This compound is insoluble in the electrolyte of the battery and does not appear to enter into any chemical combination with the lead oxid of the paste or with the metallic lead composing the grid.

The radium element of radio-activity supplied by the radium-barium sulfate, in the lead oxid paste, is believed to act merely by its presence in said paste to bring about a closer anatomical relation between the molecules, and thereby to produce a more thorough electro-chemical reaction of the electric current throughout the entire mass of the paste, during the charging or discharging of the battery. It is also believed that the radio-activity of the radium element of radium-barium sulfate raises the electro-chemical affinity among the constituents of the paste, thus facilitating the chemical work of the current. The practical results obtained seem to confirm this theory. It has been found that hardly any heat is developed in the cell while working the battery lightly, or intensively above the normal loads, thus indicating the almost perfect utilization of the current. Experience has also shown that running down the battery much below 1.7 volts per cell,—even as low as one volt, does not appear to affect the plates at all. Even occasional short-circuiting does not injure them appreciably.

In the application of my improvements in the manufacture of storage batteries, I may proceed, for example, as follows: I mix with the active material, such as lead oxid paste, a sufficient amount of radium-barium sulfate to incorporate in said active material approximately 0.2 microgram of radium element per pound of lead oxid ($Pb_2O_3$) or litharge (PbO), and then apply the paste to the grids in the customary manner. The plates are then assembled and "formed" by the electric current in the usual way, and are finally mounted in cells composing a complete battery.

While the proportion of radium element above mentioned has been found to be effective, still I do not wish to confine myself to the use of such specific proportion, as the amount of such radium element may be varied more or less without detracting from the efficiency of the active material or electrode paste in which it is present.

Having fully described my invention, what I claim as new and desire to secure by Letters Patent, is:—

1. A battery electrode having an insoluble radio-active substance incorporated therein.

2. A battery electrode provided with applied active material having an insoluble radio-active substance incorporated therein.

3. A battery element comprising active material combined with an insoluble radio-active substance.

4. A battery element comprising lead oxid having an insoluble radio-active substance incorporated therein.

5. A battery element comprising an insoluble metallic grid, and a radio-active active material applied thereto.

6. A battery element comprising active material having a substance incorporated therein carrying an insoluble radium element.

7. A battery element comprising active material having radium-barium sulfate incorporated therein.

8. A storage battery electrode having an insoluble radio-active salt in contact with the active material of said electrode.

9. Active material for battery electrodes having an insoluble radio-active substance incorporated therein.

10. Active material for battery electrodes having radium-barium sulfate incorporated therein.

11. Active material for battery electrodes having an insoluble salt of radium incorporated therein.

12. Active material for battery electrodes comprising lead oxid paste having radium-barium sulfate incorporated therein.

In testimony whereof I have signed this specification in the presence of two subscribing witnesses.

HERMANN G. C. THOFEHRN.

Witnesses:
  JNO. S. FLANNERY,
  W. W. DARLEY.